(12) United States Patent
Popelka et al.

(10) Patent No.: US 12,063,197 B2
(45) Date of Patent: *Aug. 13, 2024

(54) TECHNIQUES FOR BIDIRECTIONAL CROSS-PLATFORM COMMUNICATIONS

(71) Applicant: Salesforce, Inc., San Francisco, CA (US)

(72) Inventors: Aaron Popelka, San Francisco, CA (US); William Robert Jennings, II, Indianapolis, IN (US); Andrew Short, Indianapolis, IN (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/317,022

(22) Filed: May 12, 2023

(65) Prior Publication Data

US 2023/0283585 A1 Sep. 7, 2023

Related U.S. Application Data

(63) Continuation of application No. 17/649,032, filed on Jan. 26, 2022, now Pat. No. 11,695,727.

(51) Int. Cl.
| | |
|---|---|
| *H04L 51/56* | (2022.01) |
| *G06F 16/27* | (2019.01) |
| *H04L 51/066* | (2022.01) |
| *H04L 51/10* | (2022.01) |
| *H04L 51/52* | (2022.01) |
| *H04L 67/02* | (2022.01) |
| *H04L 69/24* | (2022.01) |
| *H04L 9/40* | (2022.01) |

(52) U.S. Cl.
CPC ............. *H04L 51/56* (2022.05); *G06F 16/27* (2019.01); *H04L 51/066* (2013.01); *H04L 51/10* (2013.01); *H04L 51/52* (2022.05); *H04L 67/02* (2013.01); *H04L 69/24* (2013.01); *H04L 63/102* (2013.01)

(58) Field of Classification Search
None
See application file for complete search history.

(56) References Cited

U.S. PATENT DOCUMENTS 9,800,525 B1 * 10/2017 Lerner .................... H04L 51/56
9,972,015 B2 * 5/2018 Moore .................... H04L 51/52
(Continued)

*Primary Examiner* — Lashonda Jacobs-Burton
(74) *Attorney, Agent, or Firm* — Holland & Hart LLP

(57) ABSTRACT

A method for data processing that includes receiving, from a service that manages communications between a communication process flow management service and a communication platform, a request indicating metadata from the communication platform, information associated with a tenant of a multi-tenant system, a user identifier, or a combination thereof. The method may further include performing, based on the request, one or more actions on a communication process flow that controls electronic communications between the tenant and a set of users corresponding to the tenant. The method may further include generating a data object related to the communication process flow based on performing the one or more actions. The method may further include transmitting, to the communication platform, a message that is configured to cause posting of the data object into a communication channel of the communication platform.

20 Claims, 12 Drawing Sheets

(56) References Cited

U.S. PATENT DOCUMENTS

| | | | | |
|---|---|---|---|---|
| 10,764,233 | B1* | 9/2020 | Goldberg | H04L 51/56 |
| 11,277,359 | B2* | 3/2022 | Mia | G06F 21/31 |
| 11,303,521 | B1* | 4/2022 | Naik | H04L 41/069 |
| 11,316,818 | B1* | 4/2022 | Nagar | H04L 51/063 |
| 2015/0081569 | A1* | 3/2015 | Moore | H04W 4/21 |
| | | | | 709/204 |
| 2018/0115877 | A1* | 4/2018 | Riker | H04L 51/066 |
| 2018/0225317 | A1* | 8/2018 | Lalani | G06F 16/9017 |
| 2018/0300305 | A1* | 10/2018 | Lam | G06Q 10/101 |
| 2019/0140995 | A1* | 5/2019 | Roller | H04L 51/18 |
| 2020/0074474 | A1* | 3/2020 | Chauhan | G06Q 50/01 |
| 2021/0067486 | A1* | 3/2021 | Souhrada | H04L 12/4641 |
| 2022/0070133 | A1* | 3/2022 | Santo | H04L 51/043 |
| 2022/0114238 | A1* | 4/2022 | Padmanabhan | G06F 21/121 |
| 2022/0343250 | A1* | 10/2022 | Tremblay | G06Q 10/0633 |
| 2022/0345427 | A1* | 10/2022 | Longo, Jr. | H04L 67/306 |
| 2023/0029697 | A1* | 2/2023 | Kruk | G06N 20/00 |

\* cited by examiner welcome
A channel to develop our Welcome Campaign

● Marketing Cloud Journeys [APP] 10:37 AM
✉ Added: Email Activity by *a_popelka* in Cyber Week 2021 in Business Unit 1

● Marketing Cloud Journeys [APP] 10:44 AM
✉ Updated: Email Activity by *a_popelka* in Cyber Week 2021 in Business Unit 1
Message Name: Aaron's Email
Campaign Association: 2021 Summer Promotions
Message Last Modified: 1/19/2022, 5:31 PM MST
Activity ID: 20Hr8342kLd
Message Subject Line:
Hey %%First_Name%%, here is your %%Promo_Discount%% off coupon for signing up!
[Details]

● Marketing Cloud Journeys [APP] 10:55 AM
✉ Updated: Email Activity by *a_popelka* in Cyber Week 2021 in Business Unit 1

Message #welcome
B *I* <u>U</u>

FIG. 4

TECHNIQUES FOR BIDIRECTIONAL CROSS-PLATFORM COMMUNICATIONS

CROSS REFERENCE

The present Application for Patent claims priority to U.S. Pat. No. 11,695,727 by Popelka et al., entitled "TECHNIQUES FOR BIDIRECTIONAL CROSS-PLATFORM COMMUNICATIONS," filed Jan. 26, 2022, which is assigned to the assignee hereof and expressly incorporated by reference herein.

FIELD OF TECHNOLOGY

The present disclosure relates generally to database systems and data processing, and more specifically to techniques for bidirectional cross-platform communications.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may support systems that are used to create, manage, and update communication process flows. For example, a communication process flow management service may be used to design and implement a communication process flow that controls communications between a tenant and a set of users (e.g., subscribers), and a communication platform (e.g., separate from the cloud platform) may be used for internal communications related to cloud platform functionality. However, because the communication platform and the cloud platform may be implemented in (e.g., supported by) separate computing systems, some features of the communication process flow management system may be incompatible with the communication platform, which may result in workflow inefficiencies and decreased user satisfaction.

BRIEF DESCRIPTION OF THE DRAWINGS

FIG. 4 illustrates an example of a user interface that supports techniques for bidirectional cross-platform communications in accordance with aspects of the present disclosure.

DETAILED DESCRIPTION

Figure 1:
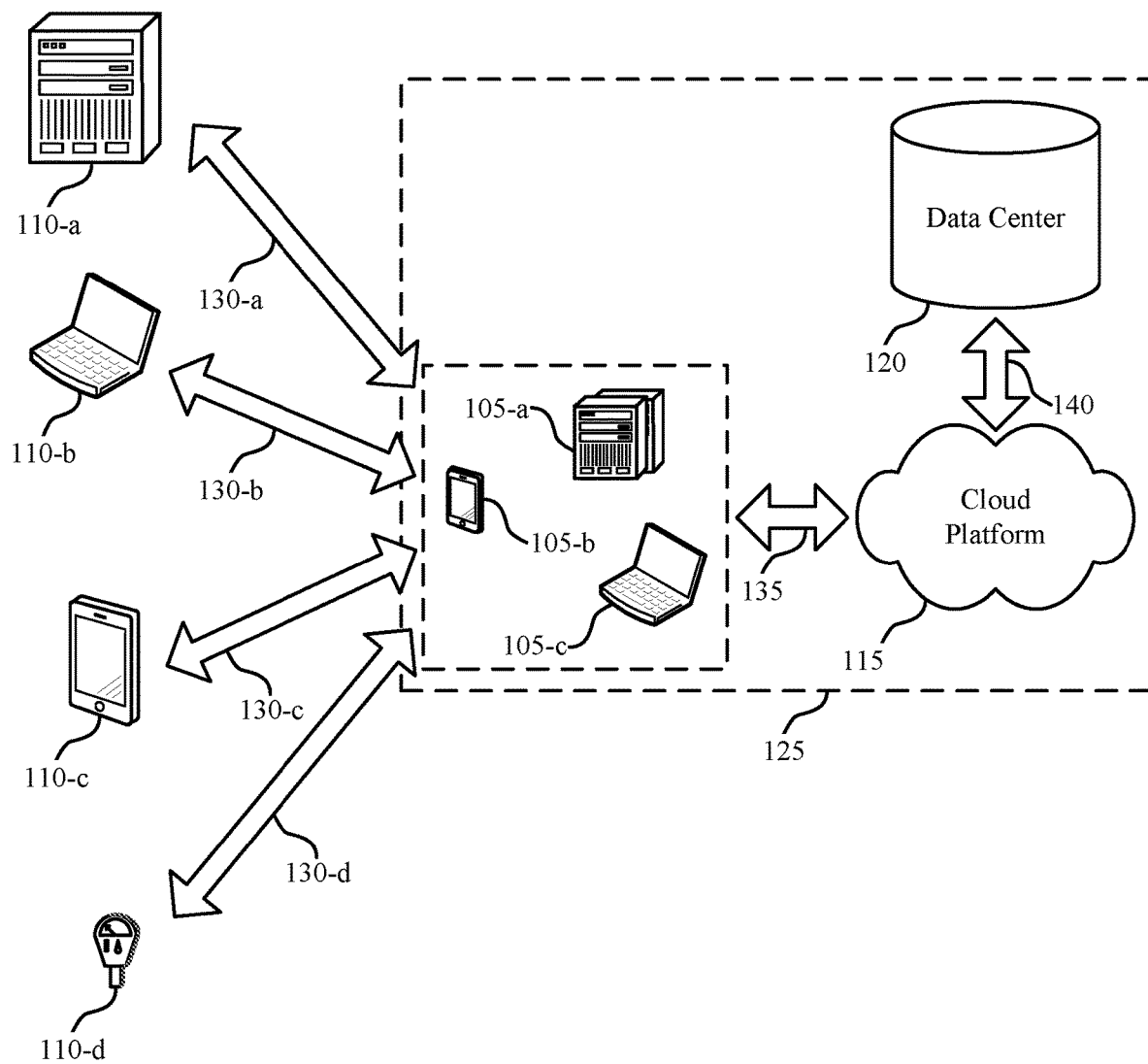
FIGS. 1 through 3 illustrate examples of data processing systems that support techniques for bidirectional cross-platform communications in accordance with aspects of the present disclosure.

Techniques described herein support bidirectional cross-platform communications between a communication process flow management service and a communication platform. A communication process flow management service may support creation, configuration, management, and deployment of a communication process flow that manages communications between a set of users and a tenant or organization. For example, an organization or tenant may use the communication process flow management service to schedule and manage communications between the organization and a set of users, which may be examples of subscribers, customers, or prospective customers of the organization. Users may receive electronic communications (e.g., emails, messages, advertisements) in accordance with a communication process flow. The communication process flow may include various actions and message configurations, and transmission of various communications may be dependent on user attributes and user web behavior, among other parameters.

In some cases, administrative users or employees associated with the tenant (e.g., a marketing team) may communicate, plan, and monitor aspects of a communication process flow using a communication platform. For example, the communication platform may support communication channels that are organized by topic, and team members may use these communication channels (e.g., chat rooms) to make decisions regarding a communication process flow. However, because the communication platform may be separate from the communication process flow management service, data associated with the communication process flow may be confined to computing systems that support the communication process flow management service. In some cases, users may use this data to determine whether to modify (e.g., update, revert, remove) aspects of a communication process flow. However, because these actions may be confined to the communication process flow management service, users may be unable to perform such actions from within the communication platform.

Techniques described herein support bidirectional communications between a communication process flow management service and a communication platform. For example, the techniques described herein may enable the communication process flow management service to post various data objects related to a communication process flow into the communication platform. Likewise, the techniques described herein may enable users to interact with the communication process flow management service from within the communication platform. The described techniques may support improved workflow efficiency, reduced communication resource overhead, and higher user satisfaction, among other benefits.

Aspects of the present disclosure may provide for improved cross-platform functionality between a communication process flow management service and a communication platform. In some examples, the communication process flow management service may receive a request from an intermediary service that manages communications between the communication process flow management service and the communication platform. The request may indicate metadata from the communication platform, information associated with a tenant of a multi-tenant system, a user identifier, or a combination thereof. Upon receiving the request, the communication process flow management service may perform one or more actions on a communication process flow that controls electronic communications between the tenant and a set of users corresponding to the tenant. After performing the one or more actions (e.g., updates, changes), the communication process flow management service may generate a data object related to the communication process flow. The communication process flow management service may transmit a message to the communication platform that is configured to cause posting of the data object into a communication channel of the communication platform.

In some examples, the request from the intermediary service may include an indication that the request is from an authenticated user of the communication process flow management service. In other examples, the communication process flow management service may generate a unique identifier for the communication process flow (or an activity from the communication process flow) after performing the one or more actions, and may trigger display of the unique identifier within the communication channel of the communication platform. If, for example, a user of the communication platform interacts with the data object in the communication channel, the communication process flow management service may receive an indication of this interaction from the intermediary service.

Aspects of the present disclosure may be implemented to realize one or more of the following advantages. The described techniques may provide improved cross-platform compatibility between a communication process flow management service and a communication platform. For example, the techniques described herein may enable users of the communication platform to interact with (e.g., affect, change, update, modify) communication process flows stored at or otherwise controlled by the communication process flow management service. Similarly, the described techniques may enable the communication process flow management service to display information related to a communication process flow within the communication platform. By supporting bidirectional communications between the communication process flow management service and the communication platform, the described techniques may enable users to update and manage communication process flows with greater efficiency, lower communication resource overhead, reduced latency, and higher user satisfaction, among other benefits.

Aspects of the disclosure are initially described in the context of an environment supporting an on-demand database service. Aspects of the disclosure are illustrated by and described with reference to data processing systems, user interfaces, and process flows. Aspects of the disclosure are further illustrated by and described with reference to apparatus diagrams, system diagrams, and flowcharts that relate to techniques for bidirectional cross-platform communications.

FIG. 1 illustrates an example of a data processing system 100 for cloud computing that supports techniques for bidirectional cross-platform communications in accordance with various aspects of the present disclosure. The data processing system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, application servers may perform the data processing. These application servers may be a cloud client 105 or located at data center 120. A cloud platform 115 may include one or more application servers that support a communication platform, a communication process flow management service, a service that manages communications between the communication process flow management service and the communication platform, a global endpoint, or a combination thereof. In some examples, these platforms, services, and endpoints may be supported by the same application server. In other examples, these platforms, services, and endpoints may be supported by separate application servers.

As described herein, a communication process flow management service may enable users to develop and manage communication process flows that control electronic communications between a tenant of a multi-tenant system (e.g., a cloud client 105) and a set of users (e.g., customers) corresponding to the tenant (e.g., contacts 110). In some cases, these users may discuss communication process flows within a communication channel of a communication platform. However, systems may not support bidirectional communications between the communication process flow management service and the communication platform. In other words, users may be unable to interact with (e.g., update, change, modify) communication process flows from within the communication platform or receive updates or objects associated with a communication process flow within the communication platform for viewing, discussion, and subsequent interaction.

Aspects of the present disclosure support bidirectional (e.g., two-way) communications between a communication process flow management service and a communication platform, which may enable users to develop and manage communication process flows from within the communication platform. For example, an authenticated user of the communication process flow management service may update or revert the configuration of a communication process flow by interacting with a user interface associated with the communication platform. Moreover, the techniques described herein may enable users to affect (e.g., interact with) communication process flows on different devices (e.g., smartphones, tablets, mobile devices) without directly interfacing with the communication process flow management service.

In some examples, a user may perform an authentication procedure to connect an account associated with a communication platform with an account associated with a communication process flow management service. Once authenticated, the user may use the communication platform to interact with communication process flows stored at or otherwise controlled by the communication process flow management service. An intermediary service that controls communications between the communication process flow management service and the communication platform may store the account information of the user, and may use this information to authenticate subsequent requests from the user.

As an example, a user may submit a request to change one or more aspects of a communication process flow by interacting with a user interface associated with a communication platform. The request may be sent to an intermediary service that manages communications between the communication platform and a communication process flow management service. The intermediary service may perform an authentication procedure to verify the identity of the user. Once authenticated, the request may be routed to an appropriate instance of the communication process flow management service. The communication process flow management may update the communication process flow based on information from the request.

After modifying the communication process flow; the communication process flow management service may assign a unique identifier to the updated communication process flow. The communication process flow management service may also generate a data object related to the communication process flow, and may transmit a message that is configured to cause posting of the data object within a communication channel of the communication platform. Thus, the techniques described herein may enable users to interact with the communication process flow management service from the communication platform (e.g., via the intermediary service), and may also enable the communication process flow management service to post or display information within the communication platform. Thus, the described techniques may support bi-directional communications between the communication process flow management service and the communication platform.

It should be appreciated by a person skilled in the art that one or more aspects of the disclosure may be implemented in a data processing system to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
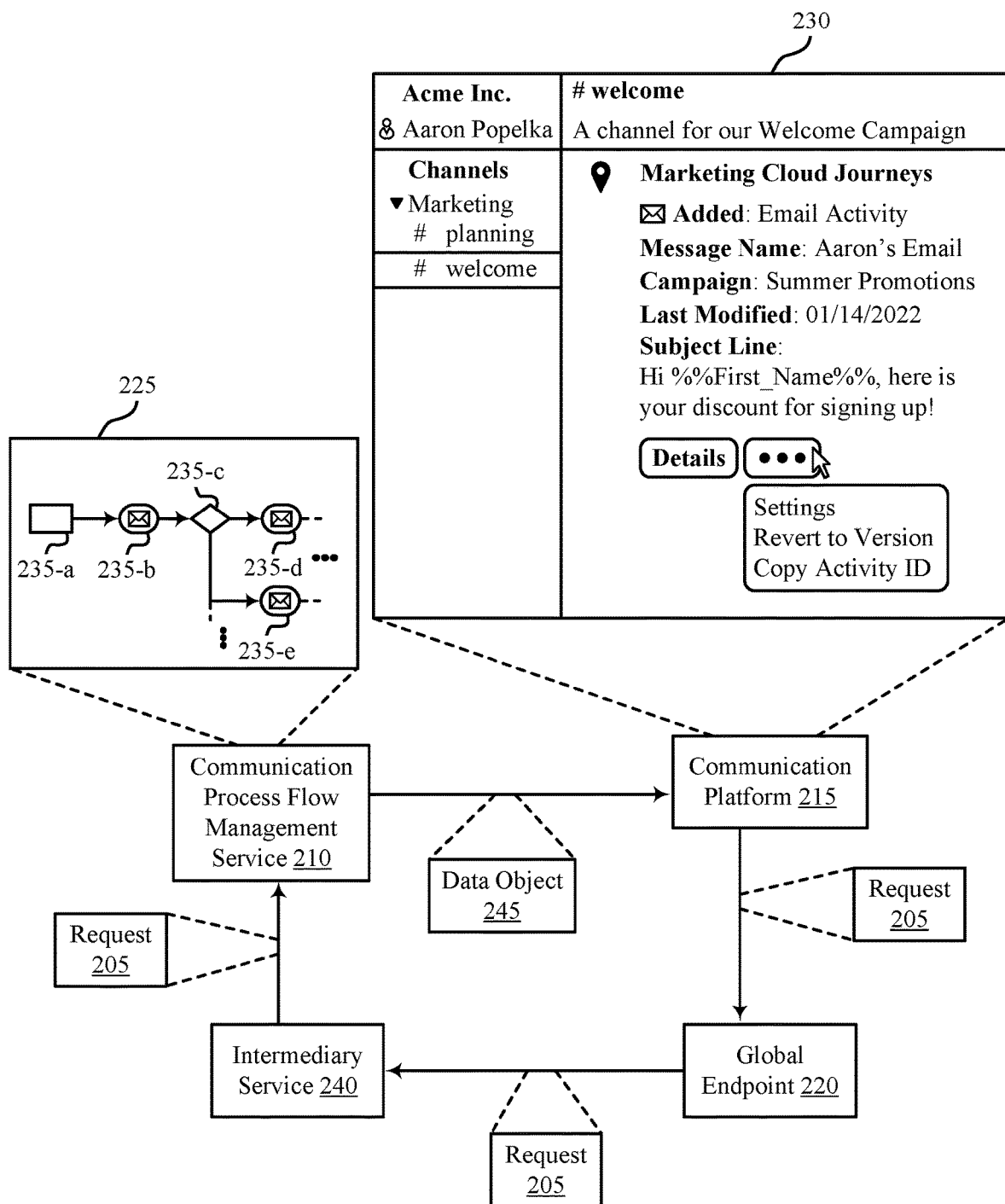

FIG. 2 illustrates an example of a data processing system 200 that supports techniques for bidirectional cross-platform communications in accordance with aspects of the present disclosure. The data processing system 200 may implement or be implemented by aspects of the data processing system 100. For example, the data processing system 200 may include a communication process flow management service 210, a communication platform 215, a global endpoint 220, and an intermediary service 240, each of which may be implemented by aspects of a cloud platform 115 or a subsystem 125 described with reference to FIG. 1. In some examples, the systems or servers supporting the communication platform 215 may include computing systems that are logically or physically separated from systems or servers supporting the communication process flow management service 210, the global endpoint 220, or the intermediary service 240.

As described herein, the communication process flow management service 210 may support creation, configuration, and implementation of various communication process flows (e.g., a communication process flow 225) that control electronic communications between a tenant and a set of users associated with the tenant. For example, users associated with the tenant may use the communication process flow management service 210 to perform actions (e.g., actions 235) that include processor-executable instructions for management of electronic communications. For example, an action 235-*a* may include instructions that, when executed by a processor, selects users (e.g., customers) for the communication process flow 225. That is, the action 235-*a* may define a rule for determining whether users are to receive electronic communications in accordance with the communication process flow 225. The rule may be based on various attributes and behaviors (e.g., demographic information, web activity patterns, purchase history) of the users. For example, users that have purchased a product from the tenant (or an organization associated with the tenant) in the last six months may receive electronic communications from the tenant in accordance with the communication process flow 225. Users that do not satisfy this criteria may not receive electronic communications in accordance with the communication process flow 225 or may receive a different communication (e.g., different content) via the communication process flow: 225.

Other actions 235 may define message transmission schemes, decision splits, and other related processes. For example, each user that satisfies a rule defined by the action 235-*a* may receive an email according to an action 235-*b*. The action 235-*b* may include specific content that is to be transmitted to the users (e.g., via email). Similarly, an action 235-*c* may define a decision split between users. For example, users that have opened an email corresponding to the action 235-*b* may be routed to an action 235-*d*, while users that have not opened the email corresponding to the action 235-*b* may be routed to an action 235-*e*. Additionally or alternatively, the action 235-*c* (e.g., a decision split) may utilize other attributes and behaviors to route users through the communication process flow 225.

The communication platform 215 may support a chat or instant messaging service used for various business functionalities. For example, teams associated with a tenant (of a multi-tenant system supported by the data processing system 200) may use the communication platform 215 to manage communication process flows supported by the communication process flow management service 210. These teams may use the communication platform 215 to discuss aspects of the communication process flow 225 or to make decisions regarding the communication process flow 225. For example, users of the communication platform 215 may decide to reconfigure or interact with the communication process flow 225 based on data from the communication process flow management service 210.

However, because the communication process flow management service 210 and the communication platform 215 may be implemented in separate computing systems, some features of the communication process flow management service 210 may be incompatible with the communication platform 215. Thus, if a decision regarding the communication process flow 225 is made by a user within the communication platform 215, the user may be unable to change or interact with the communication process flow 225 from the communication platform 215. Further, a user may be unable to post or otherwise display data associated with the communication process flow 225 into a communication channel of the communication platform 215 without manually inputting the data into a chat window of the communication platform 215.

Techniques described herein may support improved cross-platform compatibility between the communication process flow management service 210 and the communication platform 215. For example, the described techniques may enable a user of the communication platform 215 to transmit a request 205 to the communication process flow management service 210. To support such functionality, the global endpoint 220 and the intermediary service 240 may route the request 205 from the communication platform 215 to the communication process flow management service 210. The request 205 may indicate metadata from the communication platform 215, information associated with a tenant of a multi-tenant system supported by the data processing system 200, a user identifier associated with the request 205, or a combination thereof.

As described herein, requests from the communication platform 215 may be routed to the communication process flow management service 210 via the global endpoint 220 and the intermediary service 240. For example, a user may enter a command or activate a user interface component 230 within the communication platform 215, and may interact with the user interface component 230 to request additional data associated with the communication process flow 225 or to approve changes made to the communication process flow: 225. In some cases, the user interface component 230 may enable a user to interact with the communication process flow 225 directly from the communication platform 215. For example, a user may update, revert, duplicate, pause, or stop the communication process flow 225 from within the communication platform 215. Other techniques for interacting with the communication process flow 225 via the communication platform 215 are contemplated within the scope of the present disclosure.

In the example of FIG. 2, a user may interact with the user interface component 230 to revert the communication process flow 225 to a previous configuration. Accordingly, a request 205 may be transmitted from the communication platform 215 to the global endpoint 220. The global endpoint 220 may receive the request 205 from the communication platform 215 and route (e.g., forward) the request 205 to the intermediary service 240. Upon receiving the request 205 from the global endpoint 220, the intermediary service 240 may perform an authentication procedure to determine the identity of the user associated with the request 205. If the intermediary service 240 determines that the user is not authenticated, the intermediary service 240 may reject the request 205 and transmit a response back to the communication platform 215. In some examples, the response may prompt the user to provide credentials (e.g., login information) associated with the communication process flow management service 210. Upon providing this information, the intermediary service 240 may connect a first account of the user (associated with the communication platform 215) with a second account of the user (associated with the communication process flow management service 210).

If, however, the intermediary service 240 determines that the request 205 is from an authenticated user, the intermediary service 240 may forward the request 205 to the communication process flow management service 210 along with account information associated with the user. Upon receiving the request 205 from the intermediary service 240, the communication process flow management service 210 may information from the request 205 to update the communication process flow 225. For example, the communication process flow management service 210 may revert the communication process flow 225 (or various actions 235 within the communication process flow 225) to a previous configuration based on an activity identifier (also referred to herein as a unique identifier) specified in the request 205. Accordingly, the communication process flow management service 210 may generate and post (e.g., display) a data object related to the communication process flow 225 within a communication channel of the communication platform 215. In some examples, the communication process flow management service 210 may generate the data object 245 based on information or metadata provided in the request 205. The data object 245 may include a notification that the communication process flow 225 has been reverted to a previous configuration.

The data processing system 200 may support bidirectional communications between the communication process flow management service 210 and the communication platform 215. For example, the techniques described herein may enable users of the communication platform 215 to interact with (e.g., affect, change, update, modify) the communication process flow 225 stored at or otherwise controlled by the communication process flow management service 210. Similarly, the described techniques may enable the communication process flow management service 210 to display information related to the communication process flow 225 (e.g., the data object 245) within the communication platform 215. By supporting bidirectional communications between the communication process flow management service 210 and the communication platform 215, the data processing system 200 may enable users to update and manage the communication process flow 225 with greater efficiency, lower communication resource overhead, reduced latency, and higher user satisfaction, among other benefits.

Figure 3:
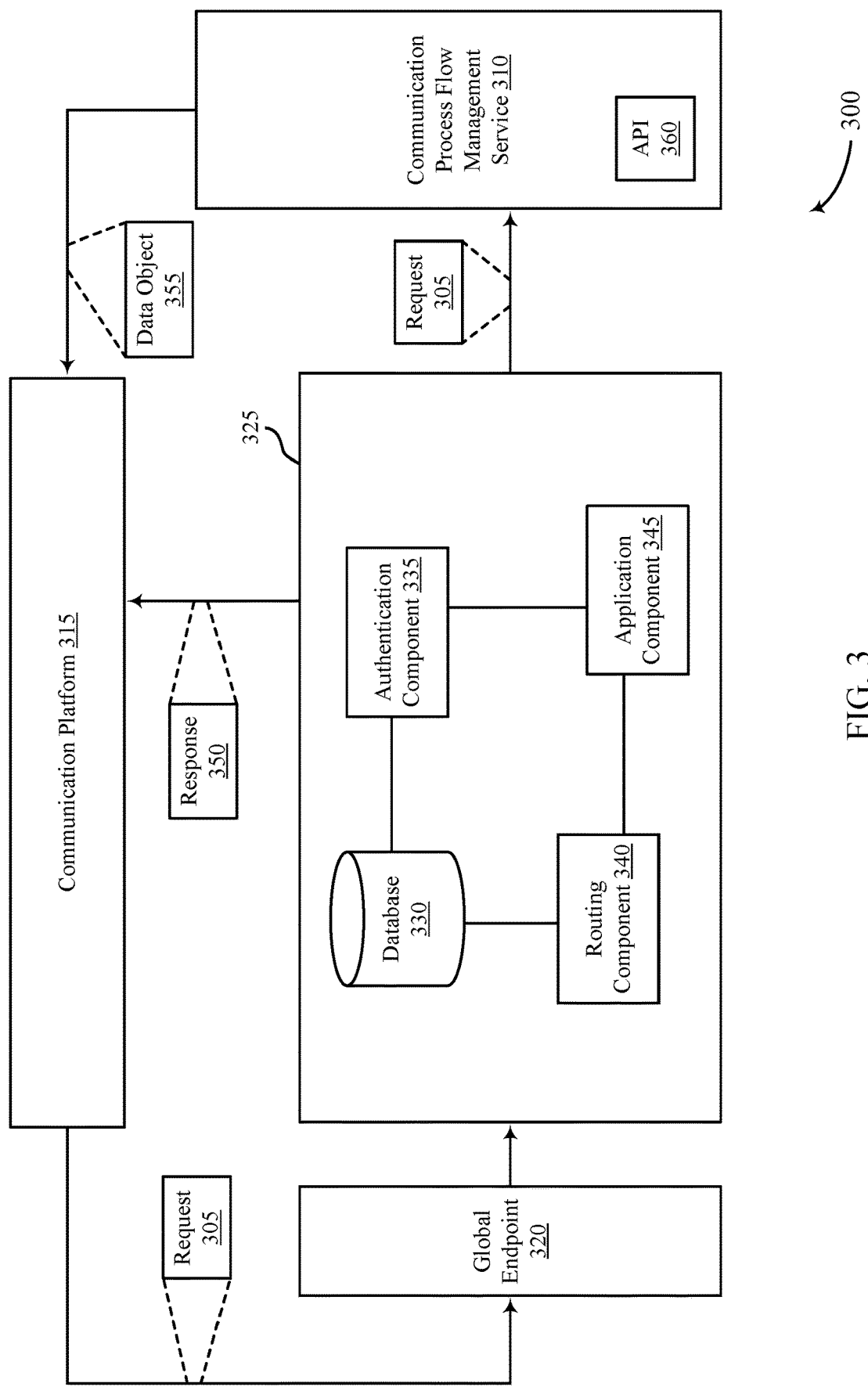

FIG. 3 illustrates an example of a data processing system 300 that supports techniques for bidirectional cross-platform communications in accordance with aspects of the present disclosure. The data processing system 300 may implement or be implemented by aspects of the data processing system 100 or the data processing system 200. For example, the data processing system 300 may include a communication process flow management service 310, a communication platform 315, a global endpoint 320, and an intermediary service 325, which may be examples of corresponding devices described with reference to FIG. 2. The data processing system 300 may support two-way communications between the communication process flow management service 310 and the communication platform 315.

The data processing system 300 may support improved cross-platform functionality between the communication process flow management service 310 and the communication platform 315. In some examples, the communication process flow management service 310 may receive a request 305 from the intermediary service 325 that manages communications between the communication process flow management service 310 and the communication platform 315. The request 305 may indicate metadata from the communication platform 315, information associated with a tenant of a multi-tenant system, a user identifier, or a combination thereof. Upon receiving the request 305, the communication process flow management service 310 may perform one or more actions on a communication process flow that controls electronic communications between the tenant and a set of users corresponding to the tenant. After performing the one or more actions (e.g., updates, changes), the communication process flow management service 310 may generate a data object 355 related to the communication process flow: The communication process flow management service 310 may transmit a message to the communication platform 315 that is configured to cause posting of the data object 355 into a communication channel of the communication platform 315.

In some examples, the request 305 from the intermediary service 325 may include an indication that the request 305 is from an authenticated user of the communication process flow management service 310. In other examples, if the request 305 is from an unauthenticated user or a user that does not have permission to access the communication process flow management service 310, the intermediary service 325 may transmit a response 350 to the communication platform 315. The response 350 may include an indication that the request 305 was rejected. The response 350 may also prompt the user to perform an authentication procedure (e.g., by providing login information for the communication process flow management service 310), which may enable the intermediary service 325 to confirm the identity of the user.

In some examples, the communication process flow management service 310 may generate a unique identifier for the communication process flow (or an activity from the communication process flow) after performing the one or more actions, and may trigger display of the unique identifier (e.g., along with the data object 355) within the communication channel of the communication platform 315. If, for example, a user of the communication platform 315 interacts with the data object 355 in the communication channel, the communication process flow management service 310 may receive an indication of this interaction from the intermediary service 325.

In the example of FIG. 2, the request 305 may be routed from the communication platform 315 to the intermediary service 325 via a global endpoint 320. The intermediary service 325 may include a database 330, an authentication component 335, a routing component 340, and an application component 345. The database 330 may store account information for users associated with the communication platform 315, account information for users associated with the communication process flow management service 310, and a mapping between the two. That is, the database 330 may map user identifiers (and corresponding account information) associated with the communication platform 315 to user identifiers (and corresponding account information) associated with the communication process flow management service 310, which may enable the intermediary service 325 to determine whether the request 305 is from an authenticated user of the communication process flow management service 310.

The authentication component 335 may lookup (e.g., query) and retrieve account information from the database 330 to validate the identity of a user associated with the request 305. The routing component 340 may determine (e.g., based on the account information provided by the authentication component 335) which instance (e.g., segment, component) of the communication process flow management service 310 is the intended recipient of the request 305 (e.g., such that the request 305 can be forwarded to this instance). The application component 345 may be capable of interfacing with the communication platform 315, displaying (e.g., rendering) information from the communication platform 315 within the communication process flow management service 310, and generating data objects that are ingestible by the communication platform 315. The communication process flow management service 310 may include an application programming interface (API) component 360 that enables the communication process flow management service 310 to communicate with the intermediary service 325.

The data processing system 300 may support bidirectional communications between the communication process flow management service 310 and the communication platform 315. For example, the techniques described herein may enable users of the communication platform 315 to interact with (e.g., affect, change, update, modify) a communication process flow stored at or otherwise controlled by the communication process flow management service 310. Similarly, the described techniques may enable the communication process flow management service 310 to display information related to a communication process flow (e.g., the data object 355) within the communication platform 315. By supporting bidirectional communications between the communication process flow management service 310 and the communication platform 315, the data processing system 300 may enable users to update and manage communication process flows with greater efficiency, lower communication resource overhead, reduced latency, and higher user satisfaction, among other benefits.

FIG. 4 illustrates an example of a user interface 400 that supports techniques for bidirectional cross-platform communications in accordance with aspects of the present disclosure. The user interface 400 may implement or be implemented by aspects of the data processing system 100, the data processing system 200, or the data processing system 300. For example, the user interface 400 may be implemented at a communication platform, which may be an example of the communication platform 215 or the communication platform 315 described with reference to FIGS. 2 and 3. The user interface 400 may support bidirectional communications between the communication platform and a communication process flow management service by enabling users of the communication platform to interact with (e.g., update, save, change, revert) communication process flows from within a communication channel of the communication platform.

The user interface 400 may enable a user of a communication platform to discuss, develop, and manage communication process flows that control electronic communications between a tenant of a multi-tenant system and a set of users (e.g., clients, customers) associated with the tenant. The communication platform may include various communication channels 450, each of which may be specific to a project, a team, a business unit, or a communication process flow, among other examples. For example, the communication platform may include a communication channel related to planning, a communication channel associated with a marketing team, and a communication channel for a welcome campaign. The communication platform may support various modes of communication (e.g., threads, direct messages (DMs), mentions, reactions) between users, and may support integration of other applications (e.g., Marketing Cloud Journeys application) within the communication platform.

As illustrated in the example of FIG. 4, a communication channel of the communication platform (e.g., # welcome) may include an audit log of previous updates or changes made to a communication process flow. The audit log may be generated by an application associated with a communication process flow management service (e.g., Marketing Cloud Journeys). If, for example, an action (e.g., email activity) is updated or added to a communication process flow, an indication of this activity may be displayed within the audit log. This indication may include a user identifier 410 (e.g., a_popelka) associated with the activity, a communication process flow identifier 415 (e.g., Cyber Week 2021) associated with the activity, a sub-tenant identifier 420 (e.g., Business Unit 1) associated with the activity, and a timestamp (e.g., 10:37 AM) associated with the activity. As discussed herein, the "audit log" may be a series of entries or posting into a channel of the communication platform.

Some indications in the audit log may include supplemental information related to an activity (equivalently referred to herein as a communication process flow action). For example, an indication may include an activity identifier 435 (e.g., 20Hr8342kLd) associated with metadata that defines a specific action configuration, an option 440 to view additional details related to the activity, an option 425 to revert the activity to a previous configuration, or an option 430 to copy the activity identifier 435. After interacting with (e.g., selecting) the option 430, a user may post the activity identifier 435 into a chat window 445 of the communication platform, which may enable the activity identifier 435 (and corresponding configuration) to be shared with other users of the communication platform. Interacting with the option 425 may trigger a request to revert a communication process flow to a previous state or configuration.

In some examples, the audit log may also include a list of recommended actions (e.g., activities) for a communication process flow. A communication process flow management service may identify these recommended actions from actions that were previously added to the communication process flow or from actions that are present in similar communication process flows. The list may include a unique identifier for each recommended action, which can be used to retrieve metadata associated with the recommended action. If, for example, a user selects a recommended action from the list, a request may be sent from the communication platform to the communication process flow management service. The request may include the unique identifier associated with the selected action, an identifier of the communication process flow to which the selected action is to be added, an identifier of the user that selected the action, or a combination thereof. Using this information, the communication process flow management service may add the selected action to the communication process flow. Once the selected action has been added to the communication process flow, the communication process flow management may post a notification into the audit log.

In some examples, the user interface 400 may correspond to a specific permission or authentication level. For example, users that are not authorized to modify communication process flows may not be presented with the option 425 to revert an action to a previous configuration. Alternatively, unauthorized (e.g., unauthenticated) users may be prompted to submit a reason for updating or reverting a specific communication process flow action. After submitting this information, the requested changes and the reason for the requested changes may be presented to an authenticated user of the communication process flow management service. The authenticated user may approve or reject the requested changes by interacting with the user interface 400.

The user interface 400 may support bidirectional communications between a communication process flow management service and a communication platform. For example, the techniques described herein may enable users of the communication platform to interact with (e.g., affect, change, update, modify) communication process flows stored at or otherwise controlled by the communication process flow management service. Similarly, the described techniques may enable the communication process flow management service to display information related to a communication process flow within the communication platform. By supporting bidirectional communications between the communication process flow management service and the communication platform, the user interface 400 may enable users to update and manage communication process flows with greater efficiency, lower communication resource overhead, reduced latency, and higher user satisfaction, among other benefits.

Figure 5:
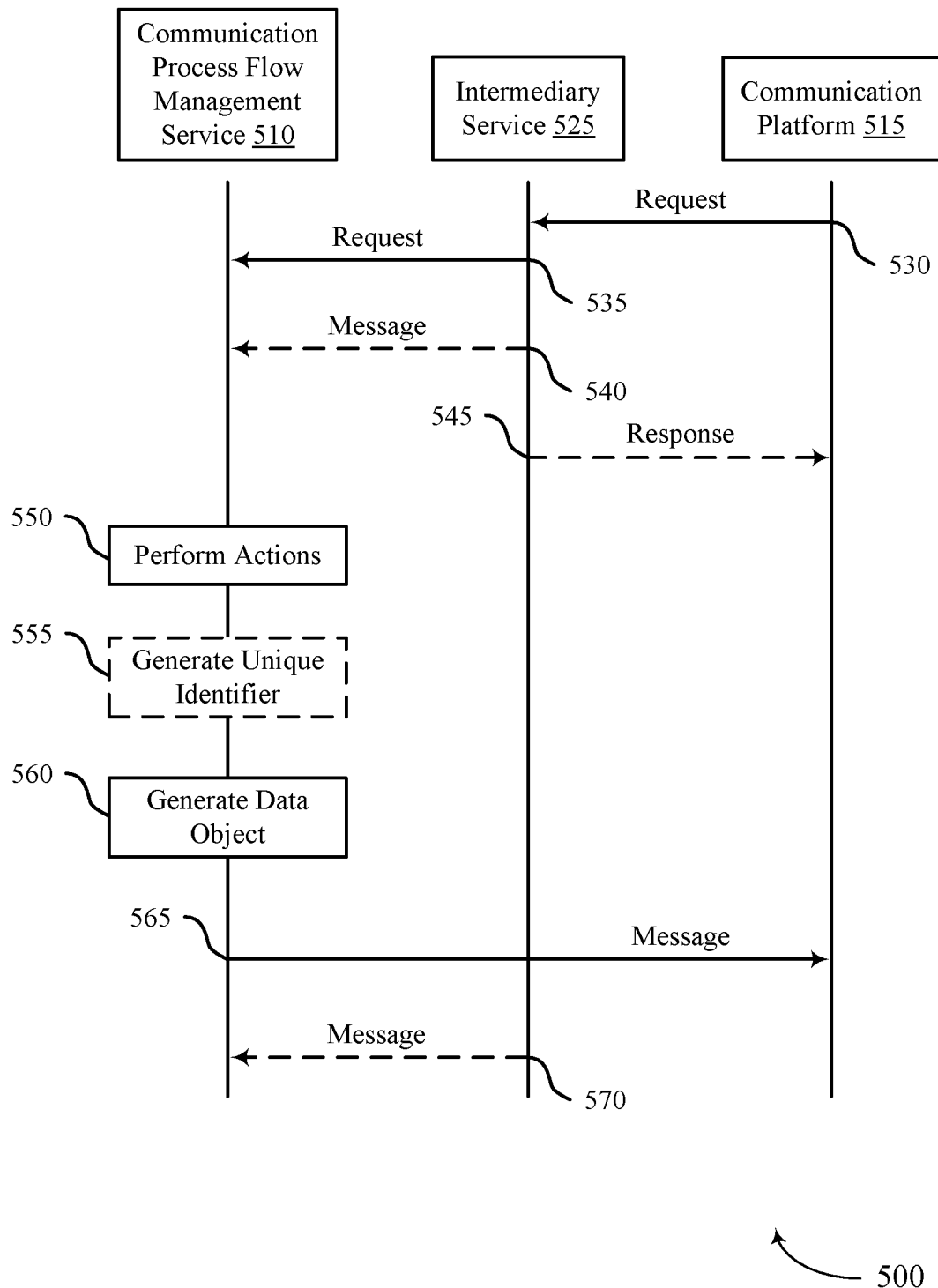
FIG. 5 illustrates an example of a process flow that supports techniques for bidirectional cross-platform communications in accordance with aspects of the present disclosure.

FIG. 5 illustrates an example of a process flow 500 that supports techniques for bidirectional cross-platform communications in accordance with aspects of the present disclosure. The process flow 500 may implement or be implemented by aspects of the data processing system 100, the data processing system 200, the data processing system 300, or the user interface 400. For example, the process flow 500 may include a communication process flow management service 510, a communication platform 515, and an intermediary service 525, which may be examples of corresponding devices (e.g., systems, servers, platforms, services) described with reference to FIGS. 1 through 4. In the following description of the process flow 500, operations between the communication process flow management service 510, the communication platform 515, and the intermediary service 525 may be performed in a different order or at a different time than as shown. Additionally or alternatively, some operations may be added to or omitted from the process flow 500.

At 530, the intermediary service 525 may receive a request from the communication platform 515. The communication platform 515 may generate the request based on a user interacting with a user interface associated with the communication platform 515. The request may indicate metadata associated with the communication platform, information associated with a tenant of a multi-tenant system, a user identifier, or a combination thereof. The user identifier indicated by the request may include an identifier of the tenant associated with the communication process flow management service 510 or an identifier of the tenant associated with the communication platform 515. The request may also indicate a unique identifier of a communication process flow stored at the communication process flow management service 510 or a unique identifier of a communication process flow action configuration. At 535, the intermediary service 525 may forward (e.g., route) the request to the communication process flow management service 510.

In some examples, the intermediary service 525 may transmit a message to the communication process flow management service 510 at 540. The message may indicate whether the request is from an authenticated user of the communication process flow management service 510. If the request is from an unauthenticated or unauthorized user, the intermediary service 525 may transmit a response back to the communication platform 515 at 545. The response may indicate that the request has been rejected or denied. The response may also prompt a user of the communication platform 515 to provide credentials (e.g., login information) for the communication process flow management service 510 such that the intermediary service 525 can verify the identity of the user.

At 550, the communication process flow management service 510 may perform one or more actions on a communication process flow that controls electronic communications between the tenant and a set of users associated with the tenant. The communication process flow management service 510 may perform the one or more actions in accordance with information from the request. For example, the communication process flow management service 510 may perform one or more create actions, undo actions, redo actions, or delete actions on the communication process flow in accordance with the request. Additionally or alternatively, the communication process flow management service 510 may duplicate or revert a configuration of an activity in the communication process flow. In some examples, the communication process flow management service 510 may perform the one or more actions based on a permission (also referred to herein as approval status, authentication status, or authorization level) corresponding to a user associated with the request.

In some examples, the communication process flow management service 510 may generate a unique identifier for the communication process flow (or an activity within the communication process flow) at 555 based on performing the one or more actions on the communication process flow. The unique identifier may be associated with metadata that defines a configuration or state of the communication process flow. At 560, the communication process flow management service 510 may generate a data object (e.g., a JavaScript Object Notation (JSON) object) related to the communication process flow based on performing the one or more actions on the communication process flow. The data object may indicate the one or more actions performed on the communication process flow, the unique identifier associated with the communication process flow, a time at which the one or more actions were performed on the communication process flow, a completion status of the one or more actions, a user identifier associated with the request, or other information related to the communication process flow. The object may be configured or formatted such that it is ingestible and usable by the communication platform.

At 565, the communication process flow management service 510 may transmit a message to the communication platform 515 that is configured to cause (e.g., trigger) posting of the data object into a communication channel of the communication platform. The data object may include an option to approve or revert the one or more actions performed on the communication process flow. In some examples, the communication process flow management service 510 may generate the message such that the data object is posted (e.g., displayed) in accordance with metadata from the request. In other words, the metadata from the request may specify a set of instructions for generating the data object or a set of instructions for posting the data object into the communication channel of the communication platform.

In some examples, a user of the communication platform 515 may interact with the data object within the communication channel of the communication platform. In such examples, the intermediary service 525 may transmit a second message to the communication process flow management service 510 at 570. The second message may indicate information related to the interaction. The second message may also include a request to approve or reject the one or more actions that the communication process flow management service 510 previously performed on the communication process flow.

The process flow 500 may support bidirectional communications between the communication process flow management service 510 and the communication platform 515. For example, the techniques described herein may enable users of the communication platform 515 to interact with (e.g., affect, change, update, modify) communication process flows stored at or otherwise controlled by the communication process flow management service 510. Similarly, the described techniques may enable the communication process flow management service 510 to display information related to a communication process flow within the communication platform 515. By supporting bidirectional communications between the communication process flow management service 510 and the communication platform 515, the process flow 500 may enable users to update and manage communication process flows with greater efficiency, lower communication resource overhead, reduced latency, and higher user satisfaction, among other benefits.

Figure 6:
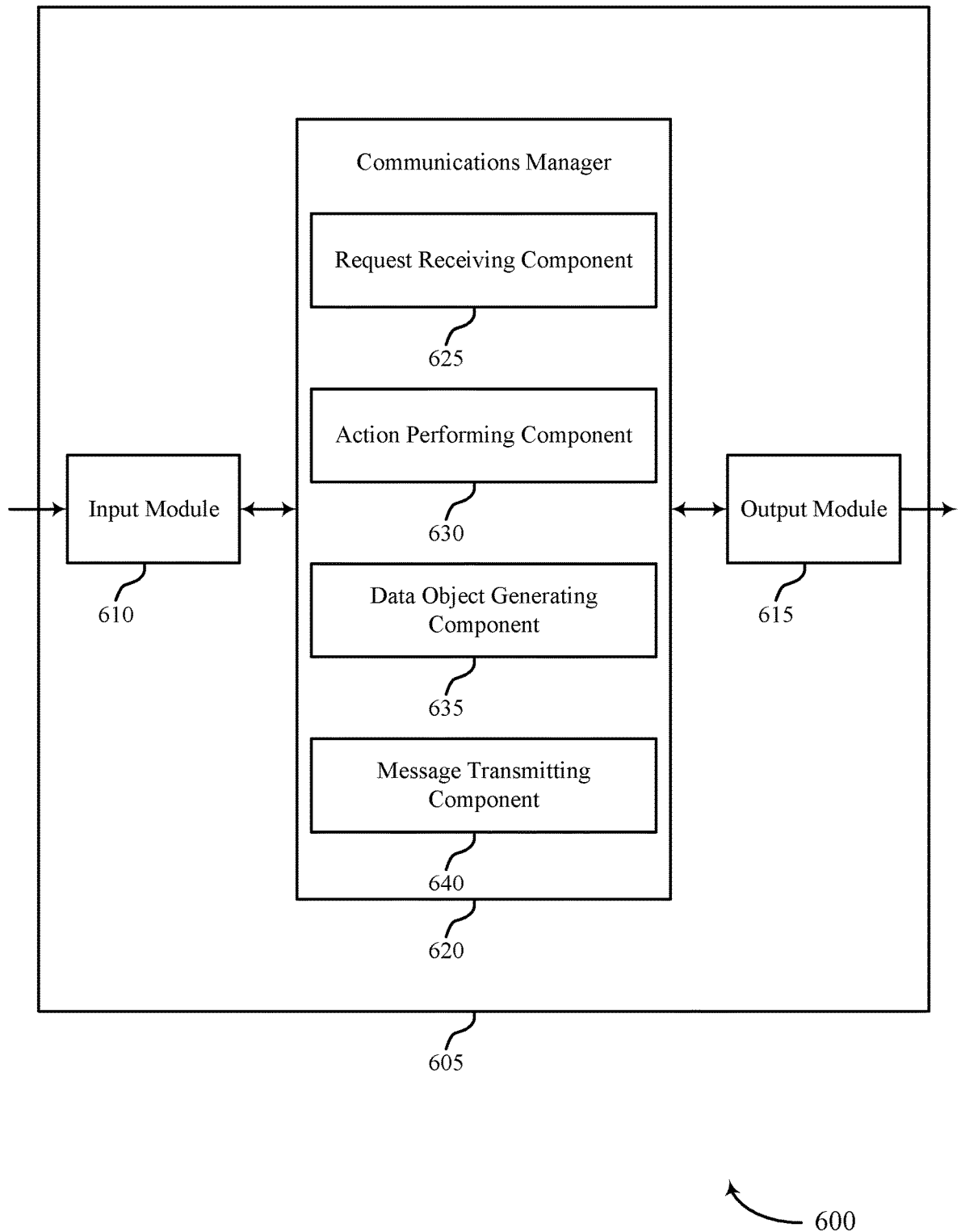
FIG. 6 shows a block diagram of an apparatus that supports techniques for bidirectional cross-platform communications in accordance with aspects of the present disclosure.

FIG. 6 shows a block diagram 600 of a device 605 that supports techniques for bidirectional cross-platform communications in accordance with aspects of the present disclosure. The device 605 may include an input module 610, an output module 615, and a communications manager 620. The device 605 may also include a processor. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the communications manager 620 to support techniques for bidirectional cross-platform communications. In some cases, the input module 610 may be a component of an input/output (I/O) controller 810 as described with reference to FIG. 8.

The output module 615 may manage output signals for the device 605. For example, the output module 615 may receive signals from other components of the device 605, such as the communications manager 620, and may transmit these signals to other components or devices. In some examples, the output module 615 may transmit output signals for display in a user interface, for storage in a database or data store, for further processing at a server or server cluster, or for any other processes at any number of devices or systems. In some cases, the output module 615 may be a component of an I/O controller 810 as described with reference to FIG. 8.

For example, the communications manager 620 may include a request receiving component 625, an action performing component 630, a data object generating component 635, a message transmitting component 640, or any combination thereof. In some examples, the communications manager 620, or various components thereof, may be configured to perform various operations (e.g., receiving, monitoring, transmitting) using or otherwise in cooperation with the input module 610, the output module 615, or both. For example, the communications manager 620 may receive information from the input module 610, send information to the output module 615, or be integrated in combination with the input module 610, the output module 615, or both to receive information, transmit information, or perform various other operations as described herein.

The communications manager 620 may support data processing in accordance with examples as disclosed herein. The request receiving component 625 may be configured as or otherwise support a means for receiving, from a service that manages communications between a communication process flow management service and a communication platform, a request indicating metadata from the communication platform, information associated with a tenant of a multi-tenant system, a user identifier, or a combination thereof. The action performing component 630 may be configured as or otherwise support a means for performing, based on the request, one or more actions on a communication process flow that controls electronic communications between the tenant and a set of users corresponding to the tenant. The data object generating component 635 may be configured as or otherwise support a means for generating a data object related to the communication process flow based on performing the one or more actions. The message transmitting component 640 may be configured as or otherwise support a means for transmitting, to the communication platform, a message that is configured to cause posting of the data object into a communication channel of the communication platform.

Figure 7:
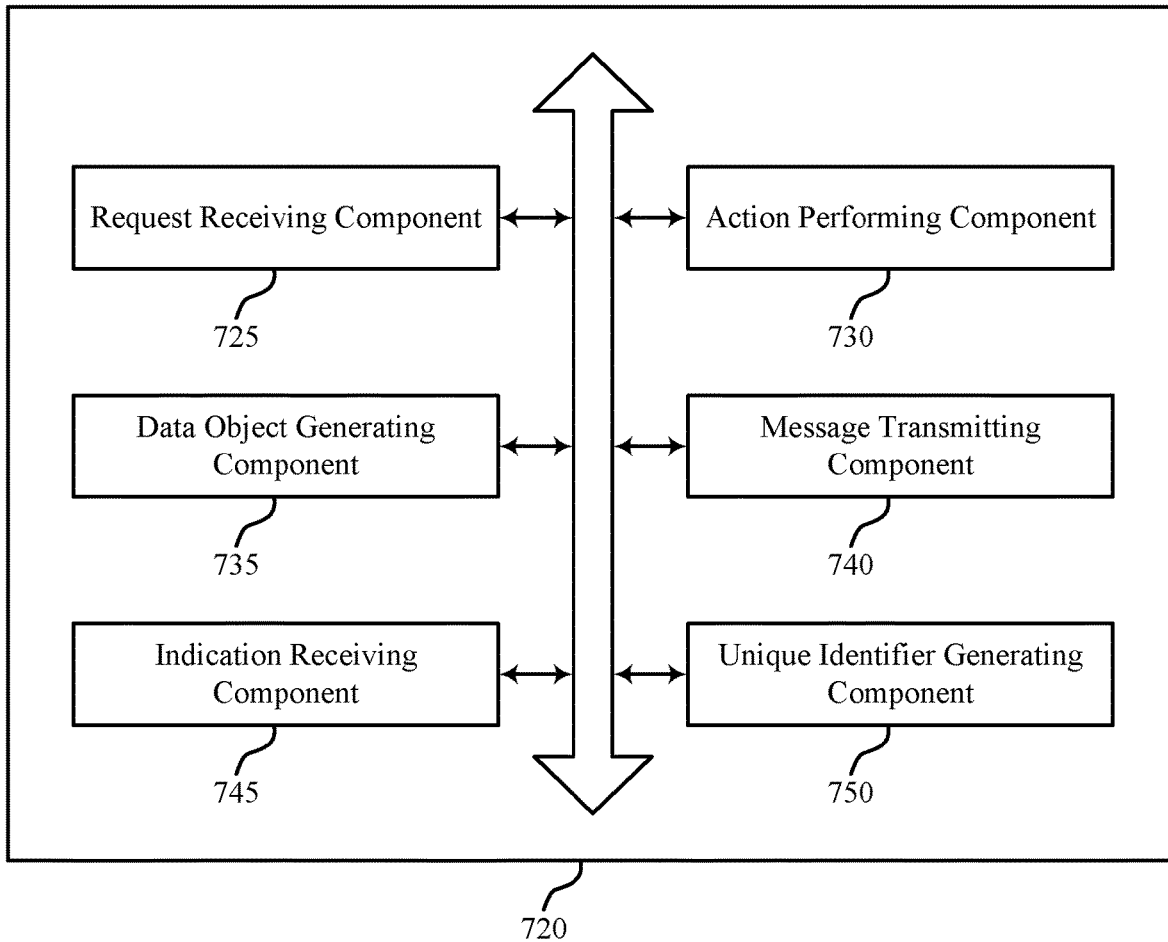
FIG. 7 shows a block diagram of a communications manager that supports techniques for bidirectional cross-platform communications in accordance with aspects of the present disclosure.

FIG. 7 shows a block diagram 700 of a communications manager 720 that supports techniques for bidirectional cross-platform communications in accordance with aspects of the present disclosure. The communications manager 720 may be an example of aspects of a communications manager or a communications manager 620, or both, as described herein. The communications manager 720, or various components thereof, may be an example of means for performing various aspects of techniques for bidirectional cross-platform communications as described herein. For example, the communications manager 720 may include a request receiving component 725, an action performing component 730, a data object generating component 735, a message transmitting component 740, an indication receiving component 745, a unique identifier generating component 750, or any combination thereof. Each of these components may communicate, directly or indirectly, with one another (e.g., via one or more buses).

The communications manager 720 may support data processing in accordance with examples as disclosed herein. The request receiving component 725 may be configured as or otherwise support a means for receiving, from a service that manages communications between a communication process flow management service and a communication platform, a request indicating metadata from the communication platform, information associated with a tenant of a multi-tenant system, a user identifier, or a combination thereof. The action performing component 730 may be configured as or otherwise support a means for performing, based on the request, one or more actions on a communication process flow that controls electronic communications between the tenant and a set of users corresponding to the tenant. The data object generating component 735 may be configured as or otherwise support a means for generating a data object related to the communication process flow based on performing the one or more actions. The message transmitting component 740 may be configured as or otherwise support a means for transmitting, to the communication platform, a message that is configured to cause posting of the data object into a communication channel of the communication platform.

In some examples, the indication receiving component 745 may be configured as or otherwise support a means for receiving, from the service that manages communications between the communication process flow management service and the communication platform, an indication that the request is from an authenticated user of the communication process flow management service, where performing the one or more actions on the communication process flow is based on the indication.

In some examples, the indication receiving component 745 may be configured as or otherwise support a means for receiving, from the service that manages communications between the communication process flow management service and the communication platform, an indication that one or more users associated with the tenant have interacted with the data object within the communication channel of the communication platform.

In some examples, the request is generated based on a user associated with the tenant interacting with a user interface associated with the communication platform. In some examples, the request includes an indication of the one or more actions to be performed on the communication process flow. In some examples, the user identifier indicated by the request includes a first user identifier of the tenant associated with the communication platform, a second user identifier of the tenant associated with the communication process flow management service, or both.

In some examples, the unique identifier generating component 750 may be configured as or otherwise support a means for generating a unique identifier for the communication process flow based on performing the one or more actions, where the unique identifier is associated with metadata that defines a configuration of the communication process flow. In some examples, the metadata from the communication platform includes metadata associated with the communication channel, metadata associated with generation of the data object, metadata associated with posting the data object into the communication channel, or a combination thereof.

In some examples, to support performing the one or more actions, the action performing component 730 may be configured as or otherwise support a means for performing the one or more actions on the communication process flow based on a permission corresponding to a user associated with the request. In some examples, the one or more actions comprise a create action, an undo action, a redo action, a delete action, or a combination thereof.

In some examples, the data object includes an indication of the one or more actions performed on the communication process flow, an option to approve the one or more actions performed on the communication process flow, an option to revert the one or more actions performed on the communication process flow, or a combination thereof. In some examples, the data object includes a timestamp associated with the one or more actions, a completion status of the one or more actions, a unique identifier associated with the communication process flow, or a combination thereof. In some examples, the data object includes a JSON object related to the communication process flow.

Figure 8:
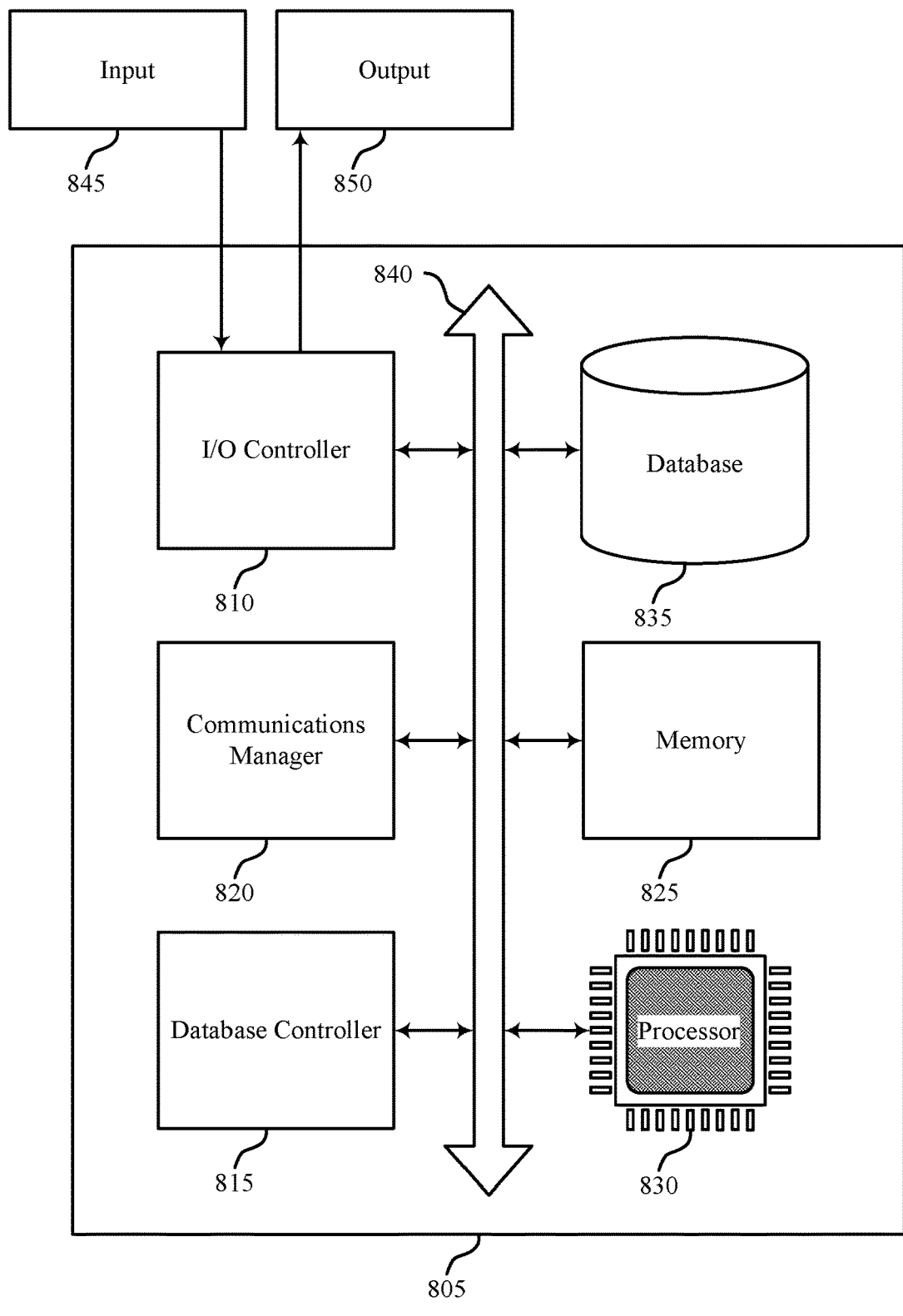
FIG. 8 shows a diagram of a system including a device that supports techniques for bidirectional cross-platform communications in accordance with aspects of the present disclosure.

FIG. 8 shows a diagram of a system 800 including a device 805 that supports techniques for bidirectional cross-platform communications in accordance with aspects of the present disclosure. The device 805 may be an example of or include the components of a device 605 as described herein. The device 805 may include components for bi-directional data communications including components for transmitting and receiving communications, such as a communications manager 820, an I/O controller 810, a database controller 815, a memory 825, a processor 830, and a database 835. These components may be in electronic communication or otherwise coupled (e.g., operatively, communicatively, functionally, electronically, electrically) via one or more buses (e.g., a bus 840).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In other cases, the I/O controller 810 may represent or interact with a modem, a keyboard, a mouse, a touchscreen, or a similar device. In some cases, the I/O controller 810 may be implemented as part of a processor 830. In some examples, a user may interact with the device 805 via the I/O controller 810 or via hardware components controlled by the I/O controller 810.

The database controller 815 may manage data storage and processing in a database 835. In some cases, a user may interact with the database controller 815. In other cases, the database controller 815 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor 830 to perform various functions described herein. In some cases, the memory 825 may contain, among other things, a basic I/O system (BIOS) which may control basic hardware or software operation such as the interaction with peripheral components or devices.

The processor 830 may include an intelligent hardware device, (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting techniques for bidirectional cross-platform communications).

The communications manager 820 may support data processing in accordance with examples as disclosed herein. For example, the communications manager 820 may be configured as or otherwise support a means for receiving, from a service that manages communications between a communication process flow management service and a communication platform, a request indicating metadata from the communication platform, information associated with a tenant of a multi-tenant system, a user identifier, or a combination thereof. The communications manager 820 may be configured as or otherwise support a means for performing, based on the request, one or more actions on a communication process flow that controls electronic communications between the tenant and a set of users corresponding to the tenant. The communications manager 820 may be configured as or otherwise support a means for generating a data object related to the communication process flow based on performing the one or more actions. The communications manager 820 may be configured as or otherwise support a means for transmitting, to the communication platform, a message that is configured to cause posting of the data object into a communication channel of the communication platform.

By including or configuring the communications manager 820 in accordance with examples as described herein, the device 805 may support techniques for bidirectional communications between a communication process flow management service and a communication platform. For example, the techniques described herein may enable users of the communication platform to interact with (e.g., affect, change, update, modify) communication process flows stored at or otherwise controlled by the communication process flow management service. Similarly, the described techniques may enable the communication process flow management service to display information related to a communication process flow within the communication platform. By supporting bidirectional communications between the communication process flow management service and the communication platform, the device 805 may enable users to update and manage communication process flows with greater efficiency, lower communication resource overhead, reduced latency, and higher user satisfaction, among other benefits.

Figure 9:
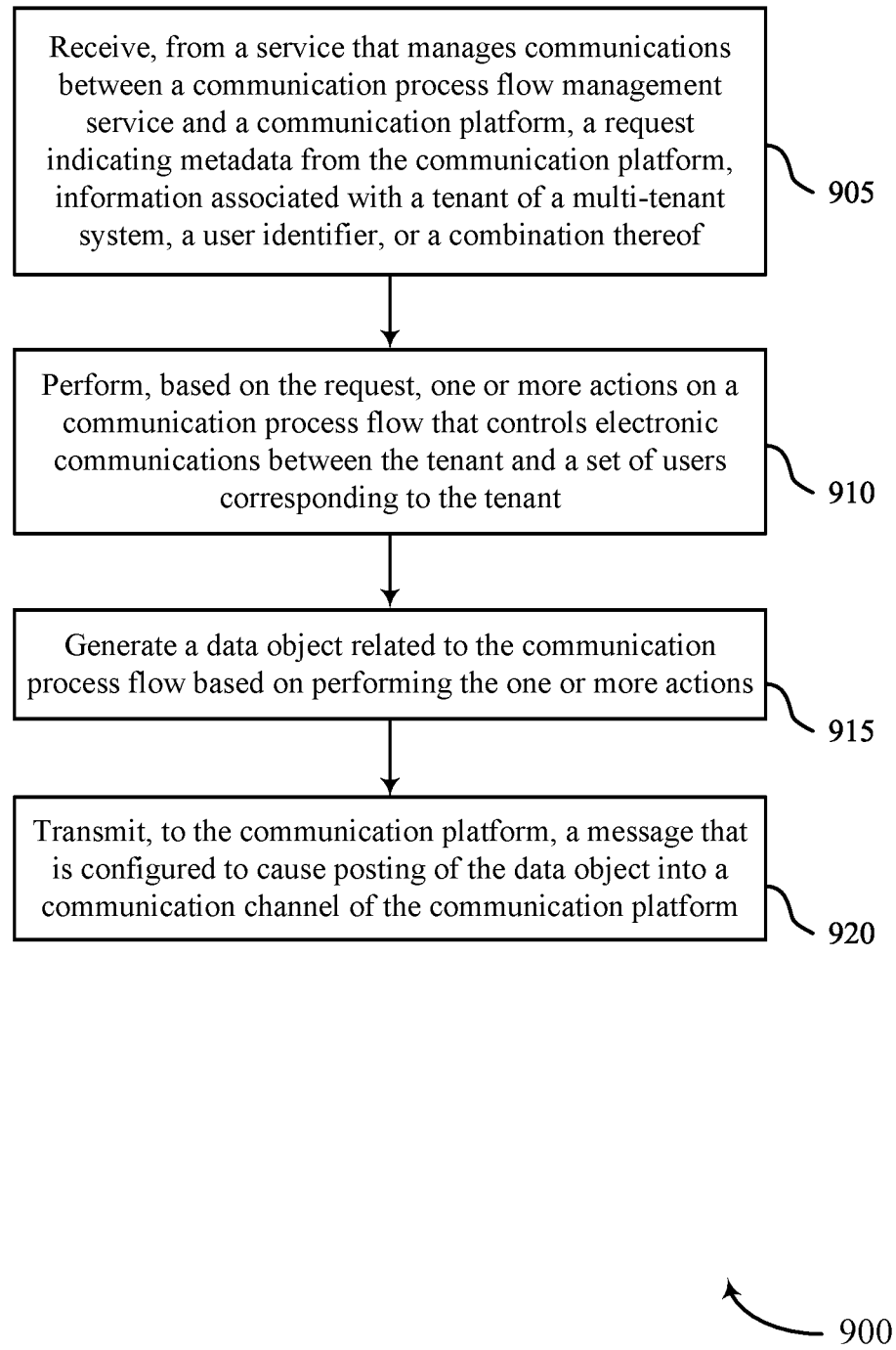
FIGS. 9 through 12 show flowcharts illustrating methods that support techniques for bidirectional cross-platform communications in accordance with aspects of the present disclosure.

FIG. 9 shows a flowchart illustrating a method 900 that supports techniques for bidirectional cross-platform communications in accordance with aspects of the present disclosure. The operations of the method 900 may be implemented by an application server or its components as described herein. For example, the operations of the method 900 may be performed by an application server as described with reference to FIGs. FIG. 1 through 8. In some examples, an application server may execute a set of instructions to control the functional elements of the application server to perform the described functions. Additionally or alternatively, the application server may perform aspects of the described functions using special-purpose hardware.

At 905, the method may include receiving, from a service that manages communications between a communication process flow management service and a communication platform, a request indicating metadata from the communication platform, information associated with a tenant of a multi-tenant system, a user identifier, or a combination thereof. The operations of 905 may be performed in accordance with examples as disclosed herein. In some examples, aspects of the operations of 905 may be performed by a request receiving component 725 as described with reference to FIG. 7.

At 910, the method may include performing, based on the request, one or more actions on a communication process flow that controls electronic communications between the tenant and a set of users corresponding to the tenant. The operations of 910 may be performed in accordance with examples as disclosed herein. In some examples, aspects of the operations of 910 may be performed by an action performing component 730 as described with reference to FIG. 7.

At 915, the method may include generating a data object related to the communication process flow based on performing the one or more actions. The operations of 915 may be performed in accordance with examples as disclosed herein. In some examples, aspects of the operations of 915 may be performed by a data object generating component 735 as described with reference to FIG. 7.

At 920, the method may include transmitting, to the communication platform, a message that is configured to cause posting of the data object into a communication channel of the communication platform. The operations of 920 may be performed in accordance with examples as disclosed herein. In some examples, aspects of the operations of 920 may be performed by a message transmitting component 740 as described with reference to FIG. 7.

Figure 10:
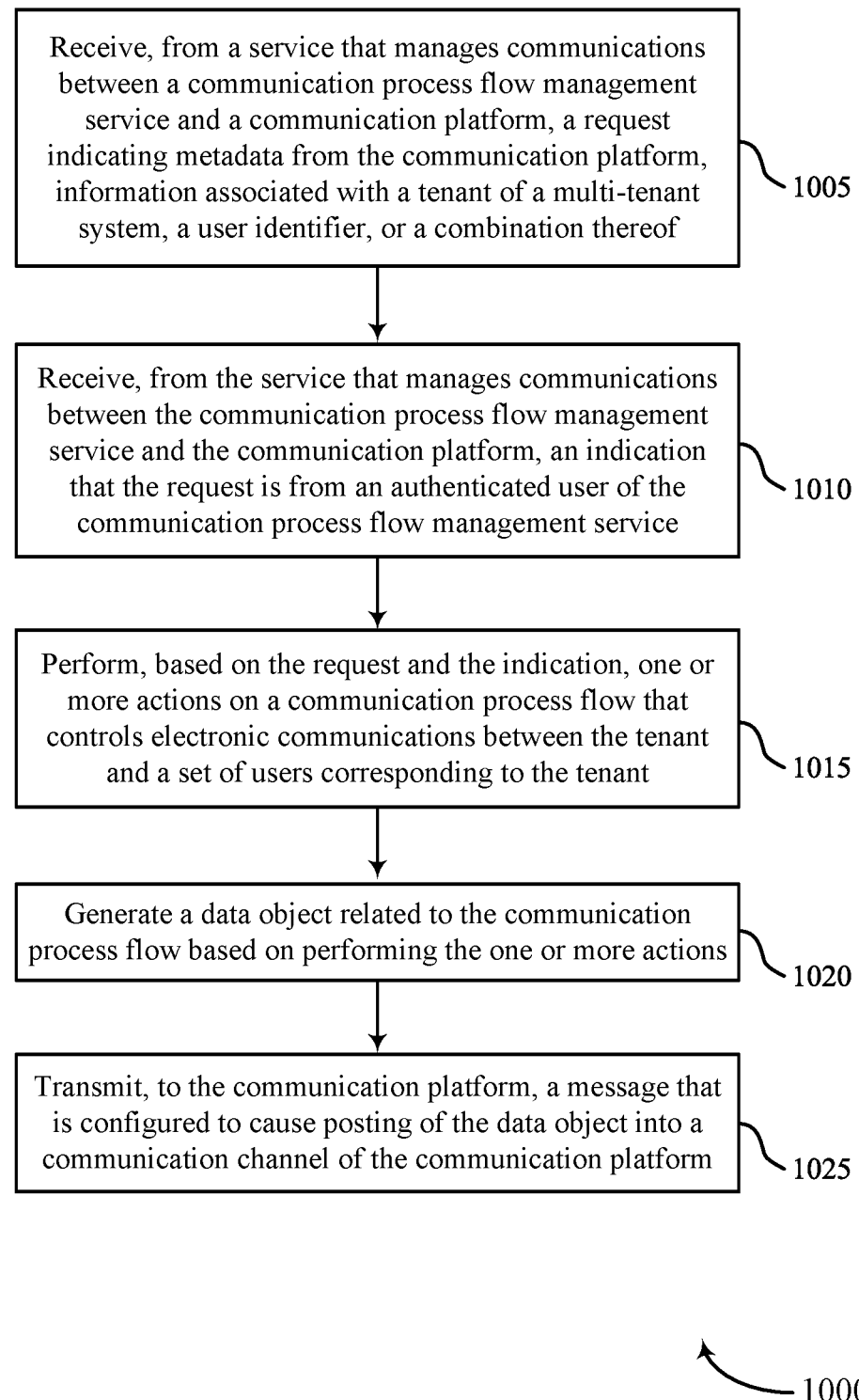

FIG. 10 shows a flowchart illustrating a method 1000 that supports techniques for bidirectional cross-platform communications in accordance with aspects of the present disclosure. The operations of the method 1000 may be implemented by an application server or its components as described herein. For example, the operations of the method 1000 may be performed by an application server as described with reference to FIGS. 1 through 8. In some examples, an application server may execute a set of instructions to control the functional elements of the application server to perform the described functions. Additionally or alternatively, the application server may perform aspects of the described functions using special-purpose hardware.

At 1005, the method may include receiving, from a service that manages communications between a communication process flow management service and a communication platform, a request indicating metadata from the communication platform, information associated with a tenant of a multi-tenant system, a user identifier, or a combination thereof. The operations of 1005 may be performed in accordance with examples as disclosed herein. In some examples, aspects of the operations of 1005 may be performed by a request receiving component 725 as described with reference to FIG. 7.

At 1010, the method may include receiving, from the service that manages communications between the communication process flow management service and the communication platform, an indication that the request is from an authenticated user of the communication process flow management service. The operations of 1010 may be performed in accordance with examples as disclosed herein. In some examples, aspects of the operations of 1010 may be performed by an indication receiving component 745 as described with reference to FIG. 7.

At 1015, the method may include performing, based on the request and the indication, one or more actions on a communication process flow that controls electronic communications between the tenant and a set of users corresponding to the tenant. The operations of 1015 may be performed in accordance with examples as disclosed herein. In some examples, aspects of the operations of 1015 may be performed by an action performing component 730 as described with reference to FIG. 7.

At 1020, the method may include generating a data object related to the communication process flow based on performing the one or more actions. The operations of 1020 may be performed in accordance with examples as disclosed herein. In some examples, aspects of the operations of 1020 may be performed by a data object generating component 735 as described with reference to FIG. 7.

At 1025, the method may include transmitting, to the communication platform, a message that is configured to cause posting of the data object into a communication channel of the communication platform. The operations of 1025 may be performed in accordance with examples as disclosed herein. In some examples, aspects of the operations of 1025 may be performed by a message transmitting component 740 as described with reference to FIG. 7.

Figure 11:
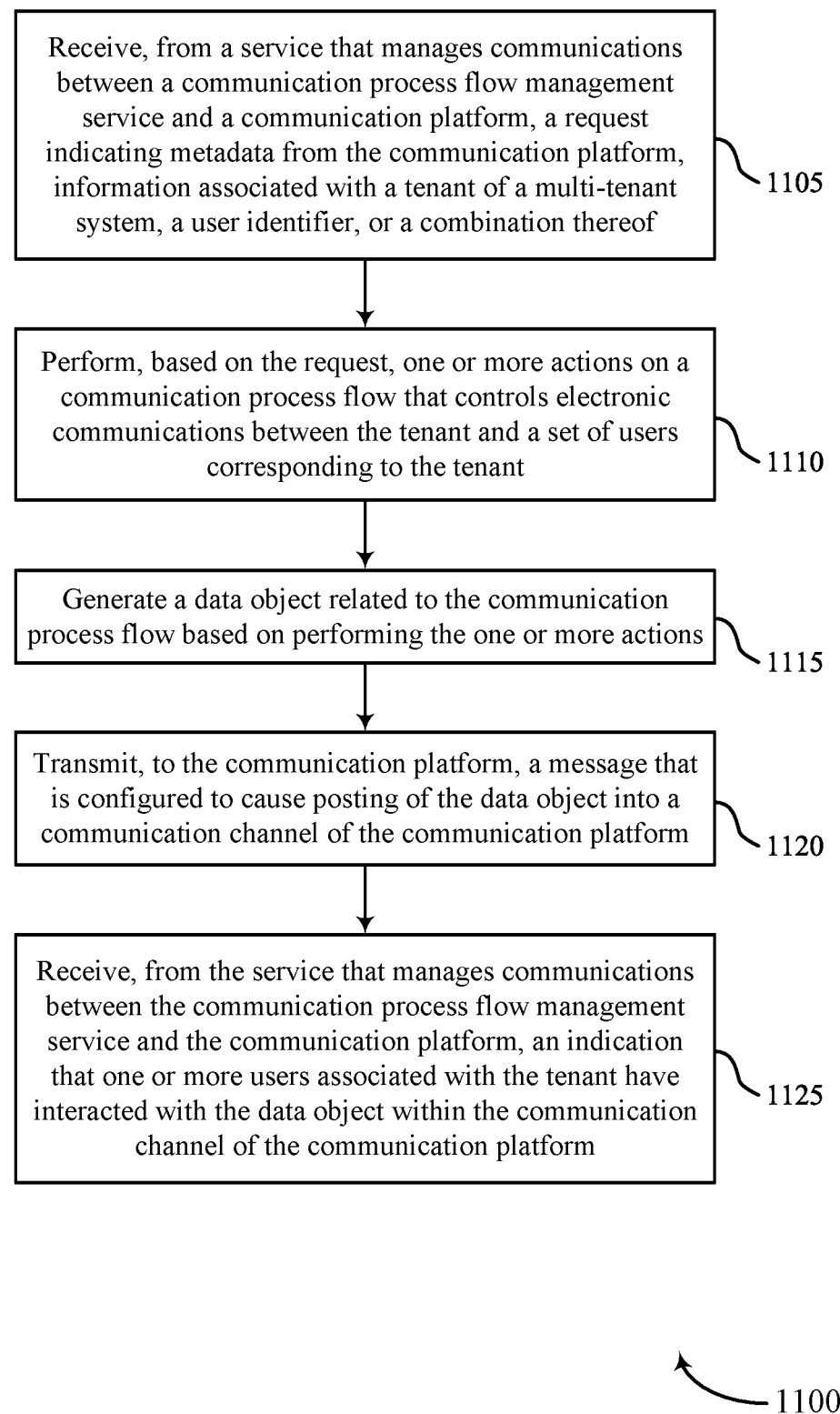

FIG. 11 shows a flowchart illustrating a method 1100 that supports techniques for bidirectional cross-platform communications in accordance with aspects of the present disclosure. The operations of the method 1100 may be implemented by an application server or its components as described herein. For example, the operations of the method 1100 may be performed by an application server as described with reference to FIGS. 1 through 8. In some examples, an application server may execute a set of instructions to control the functional elements of the application server to perform the described functions. Additionally or alternatively, the application server may perform aspects of the described functions using special-purpose hardware.

At 1105, the method may include receiving, from a service that manages communications between a communication process flow management service and a communication platform, a request indicating metadata from the communication platform, information associated with a tenant of a multi-tenant system, a user identifier, or a combination thereof. The operations of 1105 may be performed in accordance with examples as disclosed herein. In some examples, aspects of the operations of 1105 may be performed by a request receiving component 725 as described with reference to FIG. 7.

At 1110, the method may include performing, based on the request, one or more actions on a communication process flow that controls electronic communications between the tenant and a set of users corresponding to the tenant. The operations of 1110 may be performed in accordance with examples as disclosed herein. In some examples, aspects of the operations of 1110 may be performed by an action performing component 730 as described with reference to FIG. 7.

At 1115, the method may include generating a data object related to the communication process flow based on performing the one or more actions. The operations of 1115 may be performed in accordance with examples as disclosed herein. In some examples, aspects of the operations of 1115 may be performed by a data object generating component 735 as described with reference to FIG. 7.

At 1120, the method may include transmitting, to the communication platform, a message that is configured to cause posting of the data object into a communication channel of the communication platform. The operations of 1120 may be performed in accordance with examples as disclosed herein. In some examples, aspects of the operations of 1120 may be performed by a message transmitting component 740 as described with reference to FIG. 7.

At 1125, the method may include receiving, from the service that manages communications between the communication process flow management service and the communication platform, an indication that one or more users associated with the tenant have interacted with the data object within the communication channel of the communication platform. The operations of 1125 may be performed in accordance with examples as disclosed herein. In some examples, aspects of the operations of 1125 may be performed by an indication receiving component 745 as described with reference to FIG. 7.

Figure 12:
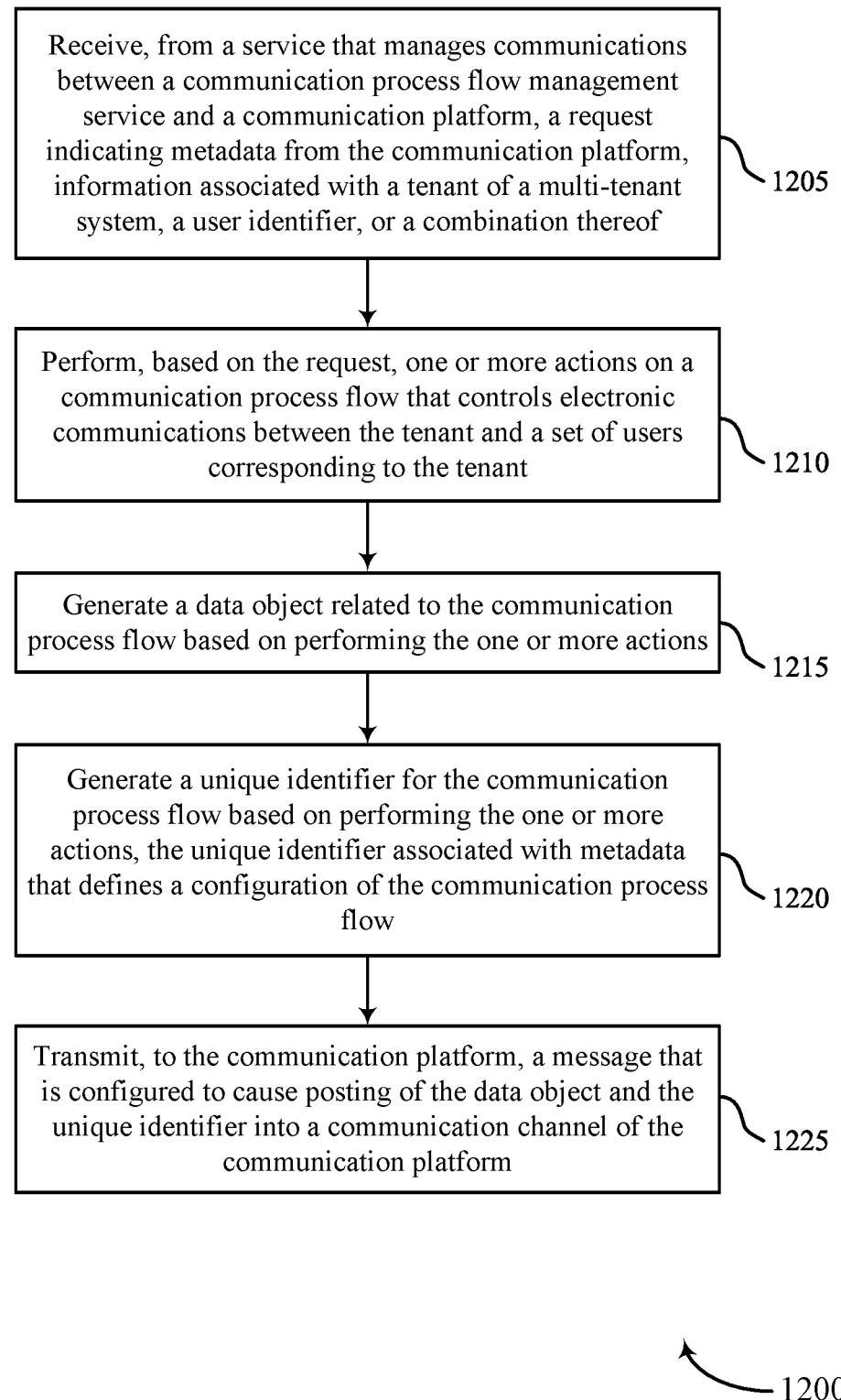

FIG. 12 shows a flowchart illustrating a method 1200 that supports techniques for bidirectional cross-platform communications in accordance with aspects of the present disclosure. The operations of the method 1200 may be implemented by an application server or its components as described herein. For example, the operations of the method 1200 may be performed by an application server as described with reference to FIGS. 1 through 8. In some examples, an application server may execute a set of instructions to control the functional elements of the application server to perform the described functions. Additionally or alternatively, the application server may perform aspects of the described functions using special-purpose hardware.

At 1205, the method may include receiving, from a service that manages communications between a communication process flow management service and a communication platform, a request indicating metadata from the communication platform, information associated with a tenant of a multi-tenant system, a user identifier, or a combination thereof. The operations of 1205 may be performed in accordance with examples as disclosed herein. In some examples, aspects of the operations of 1205 may be performed by a request receiving component 725 as described with reference to FIG. 7.

At 1210, the method may include performing, based on the request, one or more actions on a communication process flow that controls electronic communications between the tenant and a set of users corresponding to the tenant. The operations of 1210 may be performed in accordance with examples as disclosed herein. In some examples, aspects of the operations of 1210 may be performed by an action performing component 730 as described with reference to FIG. 7.

At 1215, the method may include generating a data object related to the communication process flow based on performing the one or more actions. The operations of 1215 may be performed in accordance with examples as disclosed herein. In some examples, aspects of the operations of 1215 may be performed by a data object generating component 735 as described with reference to FIG. 7.

At 1220, the method may include generating a unique identifier for the communication process flow based on performing the one or more actions, the unique identifier associated with metadata that defines a configuration of the communication process flow: The operations of 1220 may be performed in accordance with examples as disclosed herein. In some examples, aspects of the operations of 1220 may be performed by a unique identifier generating component 750 as described with reference to FIG. 7.

At 1225, the method may include transmitting, to the communication platform, a message that is configured to cause posting of the data object and the unique identifier into a communication channel of the communication platform. The operations of 1225 may be performed in accordance with examples as disclosed herein. In some examples, aspects of the operations of 1225 may be performed by a message transmitting component 740 as described with reference to FIG. 7.

A method for data processing is described. The method may include receiving, from a service that manages communications between a communication process flow management service and a communication platform, a request indicating metadata from the communication platform, information associated with a tenant of a multi-tenant system, a user identifier, or a combination thereof: performing, based on the request, one or more actions on a communication process flow that controls electronic communications between the tenant and a set of users corresponding to the tenant: generating a data object related to the communication process flow based on performing the one or more actions: and transmitting, to the communication platform, a message that is configured to cause posting of the data object into a communication channel of the communication platform.

An apparatus for data processing is described. The apparatus may include a processor, memory coupled with the processor, and instructions stored in the memory. The instructions may be executable by the processor to cause the apparatus to receive, from a service that manages communications between a communication process flow management service and a communication platform, a request indicating metadata from the communication platform, information associated with a tenant of a multi-tenant system, a user identifier, or a combination thereof: perform, based on the request, one or more actions on a communication process flow that controls electronic communications between the tenant and a set of users corresponding to the tenant: generate a data object related to the communication process flow based on performing the one or more actions: and transmit, to the communication platform, a message that is configured to cause posting of the data object into a communication channel of the communication platform.

Another apparatus for data processing is described. The apparatus may include means for receiving, from a service that manages communications between a communication process flow management service and a communication platform, a request indicating metadata from the communication platform, information associated with a tenant of a multi-tenant system, a user identifier, or a combination thereof: means for performing, based on the request, one or more actions on a communication process flow that controls electronic communications between the tenant and a set of users corresponding to the tenant: means for generating a data object related to the communication process flow based on performing the one or more actions: and means for transmitting, to the communication platform, a message that is configured to cause posting of the data object into a communication channel of the communication platform.

A non-transitory computer-readable medium storing code for data processing is described. The code may include instructions executable by a processor to receive, from a service that manages communications between a communication process flow management service and a communication platform, a request indicating metadata from the communication platform, information associated with a tenant of a multi-tenant system, a user identifier, or a combination thereof: perform, based on the request, one or more actions on a communication process flow that controls electronic communications between the tenant and a set of users corresponding to the tenant: generate a data object related to the communication process flow based on performing the one or more actions: and transmit, to the communication platform, a message that is configured to cause posting of the data object into a communication channel of the communication platform.

Some examples of the method, apparatuses, and non-transitory computer-readable medium described herein may further include operations, features, means, or instructions for receiving, from the service that manages communications between the communication process flow management service and the communication platform, an indication that the request may be from an authenticated user of the communication process flow management service, where performing the one or more actions on the communication process flow may be based on the indication.

Some examples of the method, apparatuses, and non-transitory computer-readable medium described herein may further include operations, features, means, or instructions for receiving, from the service that manages communications between the communication process flow management service and the communication platform, an indication that one or more users associated with the tenant may have interacted with the data object within the communication channel of the communication platform.

In some examples of the method, apparatuses, and non-transitory computer-readable medium described herein, the user identifier indicated by the request includes a first user identifier of the tenant associated with the communication platform, a second user identifier of the tenant associated with the communication process flow management service, or both.

Some examples of the method, apparatuses, and non-transitory computer-readable medium described herein may further include operations, features, means, or instructions for generating a unique identifier for the communication process flow based on performing the one or more actions, where the unique identifier is associated with metadata that defines a configuration of the communication process flow.

In some examples of the method, apparatuses, and non-transitory computer-readable medium described herein, performing the one or more actions may include operations, features, means, or instructions for performing the one or more actions on the communication process flow based on a permission corresponding to a user associated with the request.

In some examples of the method, apparatuses, and non-transitory computer-readable medium described herein, the data object includes an indication of the one or more actions performed on the communication process flow, an option to approve the one or more actions performed on the communication process flow, an option to revert the one or more actions performed on the communication process flow, or a combination thereof.

In some examples of the method, apparatuses, and non-transitory computer-readable medium described herein, the request includes an indication of the one or more actions to be performed on the communication process flow.

In some examples of the method, apparatuses, and non-transitory computer-readable medium described herein, the data object includes a timestamp associated with the one or more actions, a completion status of the one or more actions, a unique identifier associated with the communication process flow, or a combination thereof.

In some examples of the method, apparatuses, and non-transitory computer-readable medium described herein, the one or more actions comprise a create action, an undo action, a redo action, a delete action, or a combination thereof.

In some examples of the method, apparatuses, and non-transitory computer-readable medium described herein, the request may be generated based on a user associated with the tenant interacting with a user interface associated with the communication platform.

In some examples of the method, apparatuses, and non-transitory computer-readable medium described herein, the metadata from the communication platform includes metadata associated with the communication channel, metadata associated with generation of the data object, metadata associated with posting the data object into the communication channel, or a combination thereof.

In some examples of the method, apparatuses, and non-transitory computer-readable medium described herein, the data object includes a JSON object related to the communication process flow.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
    receiving, at a communication process flow management service, a configuration for a communication process flow that controls electronic communications between a tenant of the communication process flow management service and one or more users associated with the tenant;
    receiving, at the communication process flow management service, an indication of modification of data associated with one or more actions of the communication process flow;
    generating, by the communication process flow management service, a data object indicative of the modification; and
    transmitting, from the communication process flow management service to a communication platform, a message that is configured to cause posting of the data object into a communication channel of the communication platform.

2. The method of claim 1, wherein receiving the configuration comprises:
    receiving, from the communication platform, a request to create or modify the communication process flow; and
    creating or modifying the communication process flow in the communication platform in response to the request.

3. The method of claim 2, wherein the request to create or modify the communication process flow is received via an application within the communication platform.

4. The method of claim 2, wherein the request to create or modify the communication process flow is received via an application programming interface (API) request from the communication platform.

5. The method of claim 1, wherein the configuration comprises an identifier of the communication channel in which the data object is to be posted.

6. The method of claim 1, wherein the configuration comprises an identifier of the communication process flow.

7. The method of claim 1, further comprising:
providing an indication that creation of the communication process flow is complete.

8. The method of claim 1, wherein the modification comprises creating a new action for the communication process flow.

9. An apparatus for data processing, comprising:
a processor;
memory coupled with the processor; and
instructions stored in the memory and executable by the processor to cause the apparatus to:
receive, at a communication process flow management service, a configuration for a communication process flow that controls electronic communications between a tenant of the communication process flow management service and one or more users associated with the tenant;
receive, at the communication process flow management service, an indication of modification of data associated with one or more actions of the communication process flow;
generate, by the communication process flow management service, a data object indicative of the modification; and
transmit, from the communication process flow management service to a communication platform, a message that is configured to cause posting of the data object into a communication channel of the communication platform.

10. The apparatus of claim 9, wherein, to receive the configuration, the instructions are executable by the processor to cause the apparatus to:
receive, from the communication platform, a request to create or modify the communication process flow; and
create or modify the communication process flow in the communication platform in response to the request.

11. The apparatus of claim 10, wherein the request to create or modify the communication process flow is received via an application within the communication platform.

12. The apparatus of claim 10, wherein the request to create or modify the communication process flow is received via an application programming interface (API) request from the communication platform.

13. The apparatus of claim 9, wherein the configuration comprises an identifier of the communication channel in which the data object is to be posted.

14. The apparatus of claim 9, wherein the configuration comprises an identifier of the communication process flow.

15. The apparatus of claim 9, wherein the instructions are further executable by the processor to cause the apparatus to:
provide an indication that creation of the communication process flow is complete.

16. The apparatus of claim 9, wherein the modification comprises creating a new action for the communication process flow.

17. A non-transitory computer-readable medium storing code for data processing, the code comprising instructions executable by a processor to:
receive, at a communication process flow management service, a configuration for a communication process flow that controls electronic communications between a tenant of the communication process flow management service and one or more users associated with the tenant;
receive, at the communication process flow management service, an indication of modification of data associated with one or more actions of the communication process flow;
generate, by the communication process flow management service, a data object indicative of the modification; and
transmit, from the communication process flow management service to a communication platform, a message that is configured to cause posting of the data object into a communication channel of the communication platform.

18. The non-transitory computer-readable medium of claim 17, wherein, to receive the configuration, the instructions are executable by the processor to:
receive, from the communication platform, a request to create or modify the communication process flow; and
create or modify the communication process flow in the communication platform in response to the request.

19. The non-transitory computer-readable medium of claim 18, wherein the request to create or modify the communication process flow is received via an application within the communication platform.

20. The non-transitory computer-readable medium of claim 18, wherein the request to create or modify the communication process flow is received via an application programming interface (API) request from the communication platform.

* * * * *